(12) United States Patent
Lee et al.

(10) Patent No.: US 10,372,171 B2
(45) Date of Patent: Aug. 6, 2019

(54) KEYBOARD AND TERMINAL SYSTEM COMPRISING SAME

(71) Applicant: LG ELECTRONICS INC., Seoul (KR)

(72) Inventors: Sangchul Lee, Seoul (KR); Boram Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/744,412

(22) PCT Filed: Jul. 17, 2015

(86) PCT No.: PCT/KR2015/007444
§ 371 (c)(1),
(2) Date: Jan. 12, 2018

(87) PCT Pub. No.: WO2017/010595
PCT Pub. Date: Jan. 19, 2017

(65) Prior Publication Data
US 2018/0203484 A1    Jul. 19, 2018

(30) Foreign Application Priority Data
Jul. 15, 2015  (KR) .................. 10-2015-0100612

(51) Int. Cl.
*G06F 1/16*    (2006.01)
*G06F 3/02*    (2006.01)

(52) U.S. Cl.
CPC .......... *G06F 1/1669* (2013.01); *G06F 1/1616* (2013.01); *G06F 1/1632* (2013.01);
(Continued)

(58) Field of Classification Search
CPC .... G06F 1/1616; G06F 1/1626; G06F 1/1632; G06F 1/1669
See application file for complete search history.

(56) References Cited

U.S. PATENT DOCUMENTS 6,906,698 B2 * 6/2005 Tachikawa ............ G06F 1/1616
200/51.09
6,937,468 B2 * 8/2005 Lin ....................... G06F 1/1632
361/679.41
(Continued)

FOREIGN PATENT DOCUMENTS

EP    1 227 387 A1    7/2002

*Primary Examiner* — Nidhi Thaker
(74) *Attorney, Agent, or Firm* — Birch, Stewart, Kolasch & Birch, LLP

(57) ABSTRACT

The present invention relates to a keyboard formed so as to be attachable to and detachable from a terminal main body and capable of comprising: a keyboard main body having key buttons formed on one surface; an accommodation part formed on the one surface so as to accommodate at least a portion of the terminal main body; and a cover formed so as to be rotatable from the one surface such that the cover covers at least a portion of the accommodation part in a closed state and exposes the accommodation part in an open state. In addition, the keyboard according to the present invention is preferably formed such that the keyboard main body is turned on or off according to the opening or closing of the cover.

18 Claims, 13 Drawing Sheets

(52) U.S. Cl.
CPC .......... *G06F 1/1654* (2013.01); *G06F 1/1667* (2013.01); *G06F 1/1681* (2013.01); *G06F 3/02* (2013.01); *G06F 3/0202* (2013.01)

(56) References Cited

U.S. PATENT DOCUMENTS

| | | | |
|---|---|---|---|
| 8,599,542 B1* | 12/2013 | Healey | G06F 1/1626 |
| | | | 345/168 |
| 9,122,448 B2* | 9/2015 | Gao | G06F 1/1632 |
| 9,256,256 B2* | 2/2016 | Liang | G06F 1/1632 |
| 9,268,369 B2* | 2/2016 | Hirai | G06F 1/1669 |
| 9,389,640 B2* | 7/2016 | Lee | G06F 1/1626 |
| 10,031,556 B2* | 7/2018 | Panay | G06F 1/1654 |
| 2013/0009878 A1* | 1/2013 | Wu | G06F 1/1632 |
| | | | 345/169 |
| 2013/0170126 A1* | 7/2013 | Lee | G06F 1/1654 |
| | | | 361/679.17 |
| 2014/0321043 A1* | 10/2014 | Liu | G06F 1/1654 |
| | | | 361/679.29 |

\* cited by examiner 217 216 320 323 325 324

325 216 320 323 324

KEYBOARD AND TERMINAL SYSTEM COMPRISING SAME

CROSS REFERENCE TO RELATED APPLICATIONS

This application is the National Phase of PCT International Application No. PCT/KR2015/007444, filed on Jul. 17, 2015, which claims priority under 35 U.S.C. 119(a) to Patent Application No. 10-2015-0100612, filed in the Republic of Korea on Jul. 15, 2015, all of which are hereby expressly incorporated by reference into the present application.

TECHNICAL FIELD

The present invention relates to a keyboard, which is detachably disposed on a terminal body, and a terminal system having the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As the mobile terminal becomes multifunctional, it is implemented as a multimedia player having complicated functions such as capturing images or videos, playing music or videos, playing games, and receiving broadcastings.

Various attempts have been made to implement complicated functions in such a multimedia device by means of hardware or software.

In addition, in order to expand a function of a mobile terminal, there have been active developments of a keyboard that can be used in cooperation with a terminal body. However, the keyboard has a disadvantage in that power on and off or wireless connection management is separately required irrespective of the mounting of the terminal body.

DISCLOSURE OF THE INVENTION

An object of the present invention is to provide a keyboard configured such that a keyboard body is turned on and off depending on the attachment and detachment of a terminal body, and a terminal system having the same.

Another object of the present invention is to provide a keyboard configured such that wireless communication is connected between the keyboard and a terminal body depending on the attachment and detachment of the terminal body, and a terminal system having the same.

According to an aspect of the present invention, there is provided a keyboard detachably disposed on a terminal body, including: a keyboard body provided with key buttons on one surface; a receiving portion disposed on the one surface to receive at least a part of the terminal body; and a cover rotatably disposed on the one surface to cover at least a part of the receiving portion in a closed state and to expose the receiving portion in an open state.

In addition, the keyboard according to the present invention may be preferably configured such that the keyboard body is turned on and off depending on the opening and closing of the cover.

Further, a hinge module may be disposed at one end of the cover so that the cover can be rotated from the one surface of the keyboard body by a preset angle.

Meanwhile, in the keyboard according to the present invention, a switch for generating a signal corresponding to a control command related to the on and off operation of the keyboard body may be disposed on at least one of the one end of the cover and the part of the keyboard body facing the one end of the cover.

Specifically, the switch may be disposed at one end of the cover or the keyboard body.

When the switch is provided on the keyboard body, the one end of the cover may press the switch in either the closed state or the open state and may not press the switch in the other state.

Also, when the switch is provided on the one end of the cover, the part of the keyboard body facing the one end of the cover may press the switch in either the closed state or the open state and may not press the switch in the other state.

In the meantime, the switch may be provided with a dome-shaped button portion, and the switch may be disposed on the keyboard body so that the thickness direction of the button portion can cross the thickness direction of the keyboard body.

The keyboard related to the present invention may further include a hook portion disposed on a surface defining the one side of the receiving portion to prevent the terminal body from being rotated due to a touch pressure applied to the terminal body.

The keyboard according to the present invention may further include an opening and closing module disposed on the keyboard body to open and close the cover depending on the attachment and detachment of the terminal body.

The opening and closing module may include: a mounting portion disposed on one side of the receiving portion to be movable along the mounting direction of the terminal body depending on the attachment and detachment of the terminal body; and a driving portion having one side connected to the mounting portion and being movable on the terminal body in cooperation with the movement of the mounting portion.

A guide rail extending in a direction crossing the one surface may be disposed on the mounting portion, and a guide protrusion movable on the guide rail may be disposed on one side of the driving portion.

A stopper for limiting rotation of the cover by being caught in a recess portion disposed at one end of the cover may be disposed on the other side of the driving portion.

A pressing unit for applying force for opening the cover to the cover may be disposed at the one end of the cover.

In addition, the driving portion may include an elastic portion deformable along the moving direction of the driving portion.

Moreover, a groove may be formed in the driving portion along the longitudinal direction of the driving portion so that the elastic portion can be disposed therein, and a compressing portion for penetrating the driving portion through the groove and compressing the elastic portion may be disposed on the keyboard body.

A support portion for supporting the elastic portion in the elastic portion may be disposed on the driving portion, and a penetrating portion may be disposed in the compressing portion so that the support portion can penetrate therethrough.

In the keyboard related to the present invention, a first magnet may be disposed on a surface of the receiving portion contacting the terminal body, and a second magnet may be disposed on the terminal body to generate attractive force with the first magnet.

In addition, a connection terminal for electrical connection between the keyboard body and the terminal body may be disposed on a surface of the receiving portion contacting the terminal body.

According to another aspect of the present invention, there is provided a terminal system including a terminal body and a keyboard detachably disposed on the terminal body, wherein the keyboard includes: a keyboard body provided with key buttons on one surface; a receiving portion disposed on the one surface to receive at least a part of the terminal body; a cover rotatably disposed on the one surface to cover at least a part of the receiving portion in a closed state and to expose the receiving portion in an open state; a wireless communication unit for connecting communication between the keyboard and the terminal body; and a switch for generating a signal corresponding to a control command related to the communication connection depending on the opening and closing of the cover.

According to one embodiment of the present invention, the switch for generating the signal corresponding to the control command related to the on and off operation of the keyboard body is disposed on the keyboard body, and the cover presses the switch in the closed state and does not press the switch in the open state, which makes it possible to turn on and off the keyboard body depending on the opening and closing of the cover.

Furthermore, since the opening and closing module is disposed on the keyboard body, the cover can be opened and closed depending on the attachment and detachment of the terminal body.

According to another embodiment of the present invention, the switch generates the signal corresponding to the control command related to the wireless communication between the keyboard and the terminal body, which makes it possible to connect the wireless communication between the keyboard and the terminal body depending on the opening and closing of the cover.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as a digital TV, a desktop computer and a digital signage.

Figure 1A:
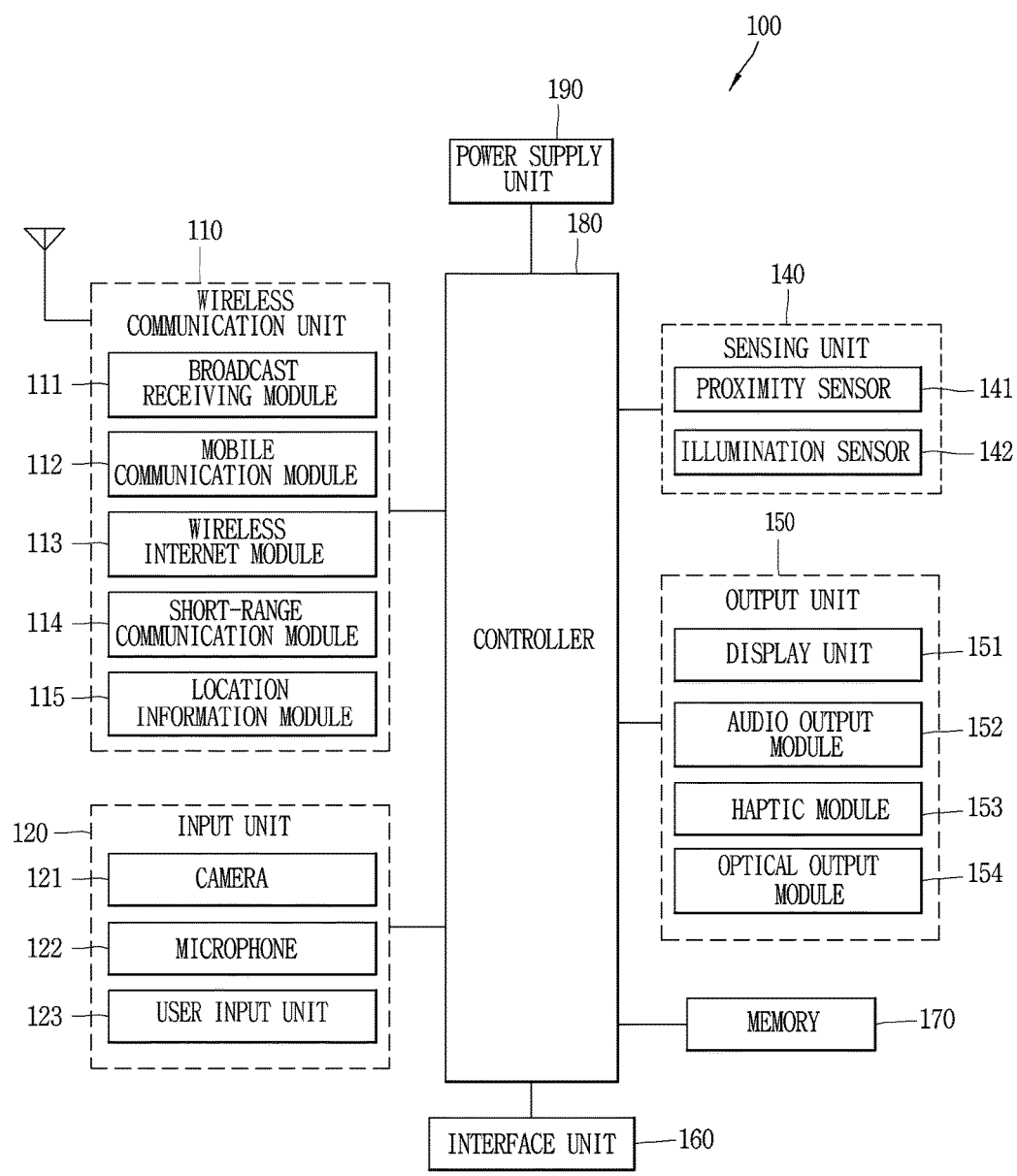
FIG. 1A is a block diagram showing a mobile terminal related to the present invention.
Figure 1B:
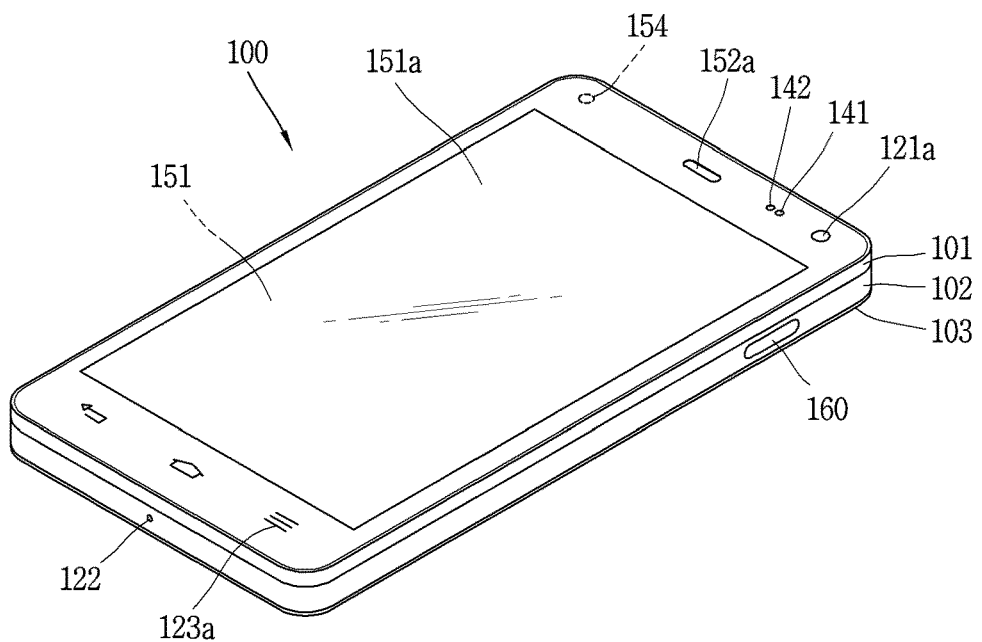
FIGS. 1B and 1C are conceptual diagrams showing one example of the mobile terminal related to the present invention, as seen in different directions.
Figure 1C:
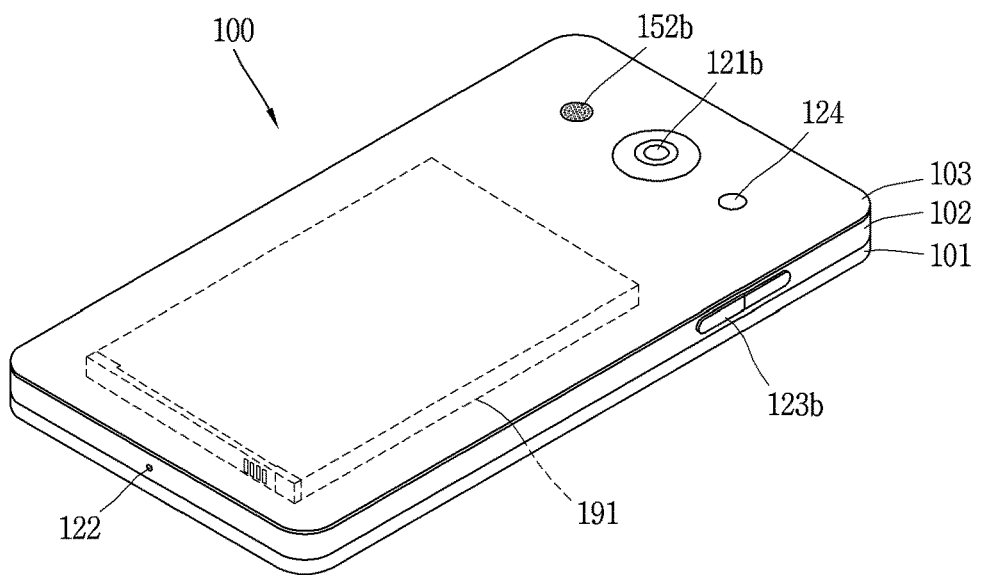

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

The controller 180 controls some or all of the components illustrated in FIG. 1A in order to drive an application program stored in the memory 170. Further, the controller 180 may operate at least two of the components of the mobile terminal 100 in order to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a mobile terminal 100 according to various embodiments to be explained later. The operation or the control method for the mobile terminal may be implemented on the mobile terminal by driving at least one application program stored in the memory 170.

Before explaining various embodiments of the mobile terminal 100, the aforementioned components will be explained in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the mobile terminal 100 disclosed herein may be provided with a bar-type terminal body. However, the present invention is not limited to this, but is also applicable to various structures such as watch type, clip type, glasses type or folder type, flip type, slide type, swing type, swivel type, or the like, in which two and more bodies are combined with each other in a relatively movable manner. Discussion herein will often relate to a particular type of mobile terminal. However, such teachings with regard to a particular type of mobile terminal will generally apply to other types of mobile terminals as well.

In this instance, the terminal body may be understood as a concept considering the mobile terminal 100 as at least one assembly.

The mobile terminal 100 may include a case (casing, housing, cover, etc.) forming the appearance of the terminal. As shown in the figures, the mobile terminal 100 may include a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some instances, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 12 b or an audio output unit 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151 a and the front case 101, between the front case 101 and the rear case 102, or between the rear case 102 and the rear cover 103, to hermetically seal an inner space when those cases are coupled.

The mobile terminal 100 may have a display unit 151, first and second audio output units 152a and 152b, a proximity sensor 141, an illumination sensor 142, an optical output unit 154, first and second cameras 121a and 121b, first and second manipulation units 123a and 123b, a microphone 122, an interface unit 160, and the like.

Hereinafter, description will be given, as illustrated in FIGS. 1B and 1C, of an exemplary embodiment of a mobile terminal, in which the display unit 151, the first audio output unit 152 a, the proximity sensor 141, the illumination sensor 142, the optical output unit 154, the first camera 121a, and the first manipulation unit 123a are disposed on a front surface of a terminal body, the second manipulation unit 123b, the microphone 122, and the interface unit 160 are disposed on a side surface of the terminal body, and the second audio output unit 152b and the second camera 121b are disposed on a rear surface of the terminal body.

However, the components are not limited to this configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display execution screen information of an application program running on the mobile terminal 100, or user interface (UI) information or graphic user interface (GUI) information according to the execution screen information.

The display unit 151 may include at least one among a liquid crystal display (LCD), a thin film transistor-liquid crystal display (TFT-LCD), an organic light emitting diode (OLED), a flexible display, a 3-dimensional (3D) display, and an e-ink display.

Two or more display units 151 may be used according to implementation of the mobile terminal 100. For instance, a plurality of the display units may be arranged on one side of the mobile terminal 100, either spaced apart from each other or integrated, or these display units may be arranged on different surfaces of the mobile terminal 100.

The display unit 151 may also include a touch sensor which senses a touch input received at the display unit 151 so as to receive a control command in a touching manner. When a touch is input to the display unit 151, the touch sensor may be configured to sense this touch and the controller 180 may generate a control command corresponding to the touch. The content input in the touching manner may be text or numbers, or a menu item which can be indicated or specified in various modes.

The touch sensor may be configured in the form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1A). Therefore, the touchscreen may replace at least some of the functions of the first manipulation unit 123a.

The first audio output unit 152a may be implemented in the form of a receiver to deliver telephone conversation to ears of a user, and the second audio output unit 152b may be implemented in the form of a loud speaker to output various alarm sounds, multimedia audio reproduction sounds, and the like.

The window 151a of the display unit 151 may include an audio hole to allow sound generated by the first audio output unit 152a to pass. However, the present invention is not limited thereto and sound may be released along an assembly gap between the structural bodies (for example, a gap between the window 151a and the front case 101). In this case, a hole independently formed to output sound may not be seen or is otherwise hidden in terms of appearance, thereby further simplifying the appearance of the mobile terminal 100.

The optical output unit 154 can be configured to output light for indicating event generation. Examples of such events include message reception, call signal reception, a missed call, an alarm, a schedule notice, email reception, information reception through an application, and the like. When a user has checked a generated event, the controller 180 can control the optical output unit 154 to stop light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by the user in order to receive a command for controlling operation of the mobile terminal 100. The first and second manipulation units 123a and 123b may also be commonly referred to as a manipulation portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

Although the first manipulation unit 123a is a touch key in this figure, the present invention is not limited thereto. For example, the first manipulation unit 123a may include a push key (mechanical key) or a combination of a push key and a touch key.

Input received at the first and second manipulation units 123a and 123b may be used in various ways. For example, the first manipulation unit 123a may receive commands such as a menu, home key, cancel, search, or the like, and the second manipulation unit 123b may receive commands for controlling a volume level output from the first and second audio output units 152a and 152b and switching a touch recognition mode of the display unit 151.

As another example of the user input unit 123, a rear input unit (not shown) may be located on the rear surface of the terminal body. The rear input unit can be manipulated by a user to receive commands for controlling operation of the mobile terminal 100. The received commands may be set in a variety of different ways. For example, a command such as power on/off, start, end or scroll, a command for controlling a volume level output from the first and second audio output units 152a and 152b, a command for switching to a touch recognition mode of the display unit 151, and the like may be received. The rear input unit may be configured to permit touch input, push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate the same using a forefinger when the user grabs the terminal body with one hand. The present invention is not limited thereto and the position of the rear input unit may be changed.

If the rear input unit is provided located on the rear surface of the terminal body, a new user interface using the same may be implemented. In addition, the above-described touchscreen or rear input unit may replace at least some of the functions of the first manipulation unit 123a located on the front surface of the terminal body. As such, if the first manipulation unit 123a is not located on the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may be embedded in the display unit 151 or the user input unit 123.

The microphone 122 receives user's voice or the other sounds. If desired, multiple microphones 122 may be provided to receive stereo sound.

The interface unit 160 may serve as an interface between the mobile terminal 100 and external devices. For example, the interface unit 160 may include at least one among a connection terminal for connecting to another device (for example, an earphone, an external speaker, or the like), a port for near field communication (for example, an Infrared Data Association (IrDA) port, a Bluetooth port, a wireless LAN port, and the like), and a power supply terminal for supplying power to the mobile terminal 100. The interface unit 160 may be implemented in the form of a socket for accommodating an external card, such as a Subscriber Identity Module (SIM), a User Identity Module (UIM), or a memory card for information storage.

The second camera 121b may be located at the rear side of the terminal body. In this case, the second camera 121b may capture images in a direction that is substantially opposite to that of the first camera unit 121a.

The second camera 121b may include a plurality of lenses arranged along at least one line. The plurality of lenses may also be arranged in a matrix. The cameras may be referred to as an "array camera." When the second camera 121b is implemented as an array camera, images may be captured in various manners using the plurality of lenses, and images with better quality may be acquired.

A flash 124 may be provided adjacent to the second camera 121b. When an image of a subject is captured with the camera 121b, the flash 124 may illuminate the subject.

The second audio output unit 152b may be further located on the terminal body. The second audio output unit 152b may implement stereophonic sound functions in conjunction with the first audio output unit 152a, and may be also used to implement a speakerphone mode for call communication.

At least one antenna for wireless communication may be located on the terminal body. The antenna may be installed in the terminal body or formed in the case. For example, an antenna which configures a part of the broadcast receiving module 111 (see FIG. 1A) may be retractable into the terminal body. Alternatively, an antenna may be formed in a film shape to be attached to an inner surface of the rear cover 103, or a case including a conductive material may function as an antenna.

The terminal body includes a power supply (190; see FIG. 1A) for supplying power to the mobile terminal 100. The power supply 190 may include a battery 191, which is mounted in the terminal body or detachably coupled to the outside of the terminal body.

The battery 191 may receive power via a power source cable connected to the interface unit 160. Also, the battery 191 can be recharged in a wireless manner using a wireless charger. Wireless charging may be implemented by magnetic induction or resonance (magnetic resonance).

In the figures, the rear cover 103 is coupled to the rear case 102 to shield the battery 191, to prevent separation of the battery 191, and to protect the battery 191 from external impact or from foreign materials. When the battery 191 is detachable from the terminal body, the rear case 103 may be detachably coupled to the rear case 102.

The mobile terminal 100 may be further provided with an accessory that aids or expands the function of the mobile terminal 100. An example of such an accessory is a keyboard that can be used in cooperation with a terminal body. The keyboard may be implemented in various forms such as a QWERTY type keyboard, a game keyboard, and a music playback keyboard.

Meanwhile, a keyboard 200 according to the present invention may be configured such that a keyboard body 210 is turned on and off depending on the opening and closing of a cover 230 disposed on the keyboard body 210, which will be described in more detail with reference to the accompanying drawings.

Figure 2A:
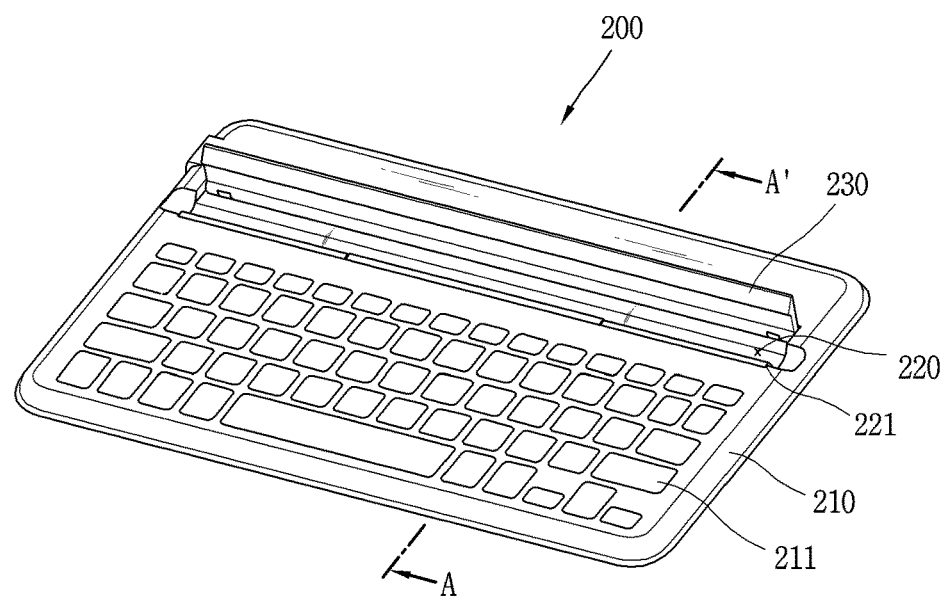
FIGS. 2A and 2B are perspective diagrams showing a keyboard according to one embodiment of the present invention.
Figure 2B:
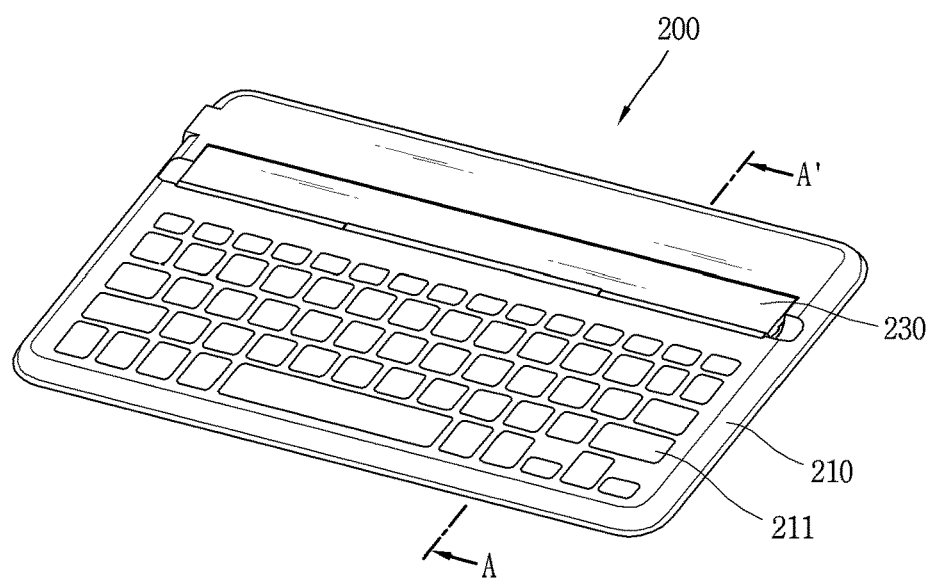
Figure 2C:
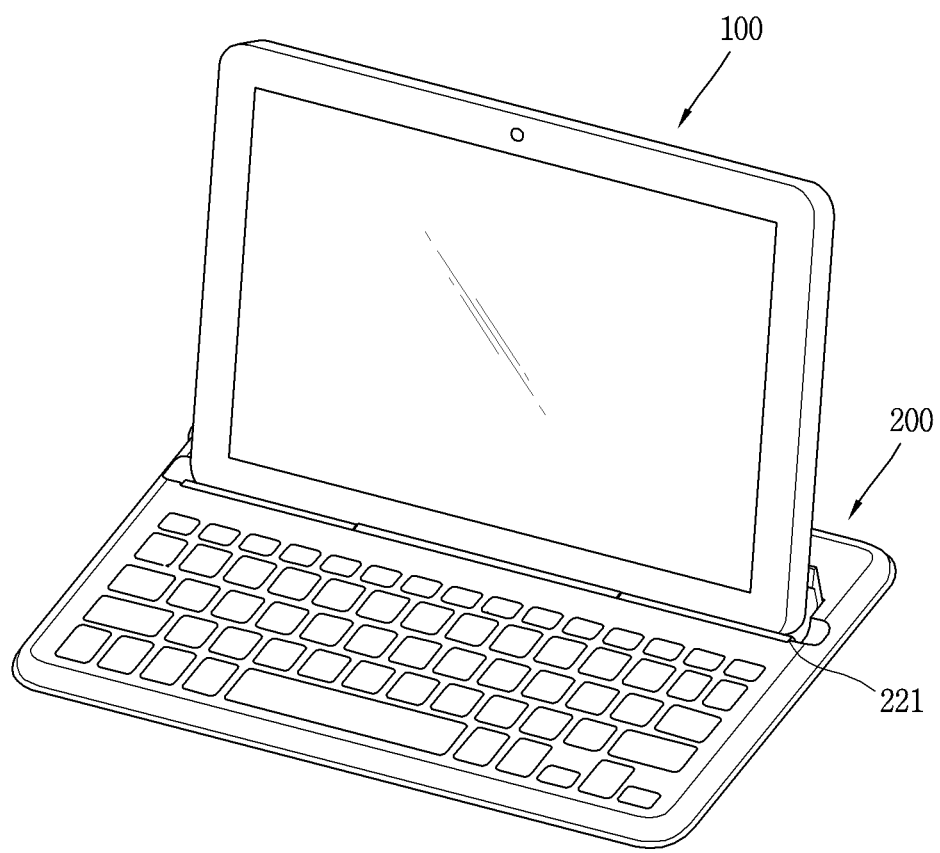
FIG. 2C is a diagram showing a using state of a terminal body and a keyboard being engaged with each other.

FIGS. 2A and 2B are perspective diagrams showing the keyboard 200 according to one embodiment of the present invention. Also, FIG. 2C is a diagram showing a using state of the terminal body and the keyboard 200 being engaged with each other.

The keyboard 200 related to the present invention includes the keyboard body 210 that forms the external appearance of the keyboard 200. A receiving portion 220 for receiving at least a part of the terminal body is disposed on the keyboard body 210.

The keyboard body 210 may include a plurality of key buttons 211 arranged on one surface. The key buttons 211 are disposed on the keyboard body 210 to be pressed.

Although not shown, a printed circuit board (not shown) on which various electronic components are mounted is disposed in the keyboard body 210. Dome switches (not shown) for inputting information as the key buttons 211 are pressed are disposed on the printed circuit board. The dome switches are disposed at positions corresponding to the positions of the key buttons 211.

In this embodiment, the key buttons 211 are disposed to push the dome switches by pressing operations, but they may also be implemented in the form of touch keys using touch operations. In this case, a touch sensor for sensing touches applied to the touch keys may be disposed on the printed circuit board.

The receiving portion 220 is disposed on the one surface of the keyboard body 210 so that at least a part of the terminal body can be received in the keyboard body 210. Specifically, the receiving portion 220 is formed in a slot shape extending along one direction of the keyboard body 210.

A cover 230 rotatably disposed on the one surface is disposed on the keyboard body 210. Specifically, a hinge module 240 is disposed at one end 231 of the cover to connect the cover 230 to the keyboard body 210 in a hinge manner. Due to the operation of the hinge module 240, the cover 230 can be rotated from the one surface of the keyboard body 210 by a preset angle.

A state in which the cover 230 covers at least a part of the receiving portion 220 may be referred to as a closed state, while a state in which the cover 230 is rotated to expose the receiving portion 220 may be referred to as an open state.

In addition to the function of covering or exposing the receiving portion 220, the cover 230 also has a function of mounting the terminal body. To this end, the other end 232 of the cover may be disposed to directly support at least a part of the terminal body received in the receiving portion 220.

The keyboard related to the present invention may further include a hook portion 221.

The hook portion 221 is disposed on a surface defining one side of the receiving portion 220 to prevent the terminal body from being rotated due to a touch pressure applied to the terminal body.

Meanwhile, the keyboard body 210 can be turned on and off depending on the opening and closing of the cover 230, which will be described in more detail with reference to the drawings.

Figure 3A:
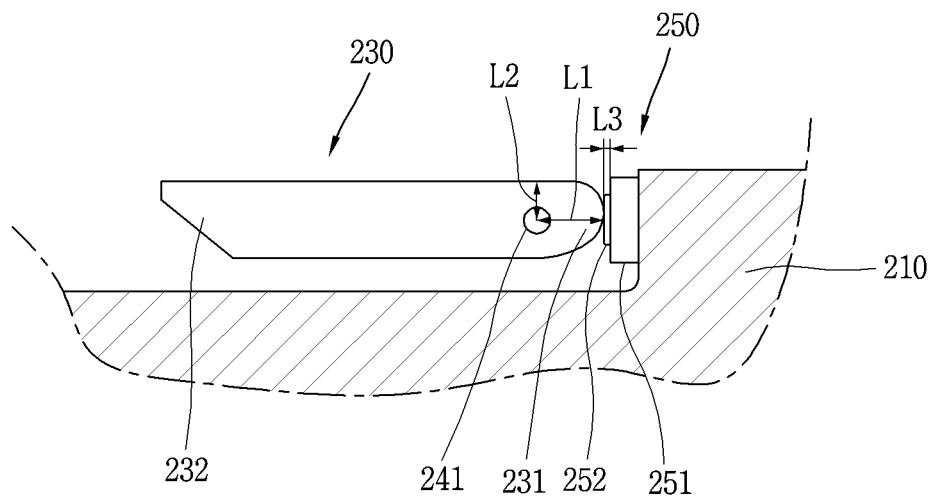
FIGS. 3A and 3B are conceptual diagrams showing layout relationships between a cover and a switch, corresponding to a closed state and an open state, respectively, according to one embodiment.
Figure 3B:
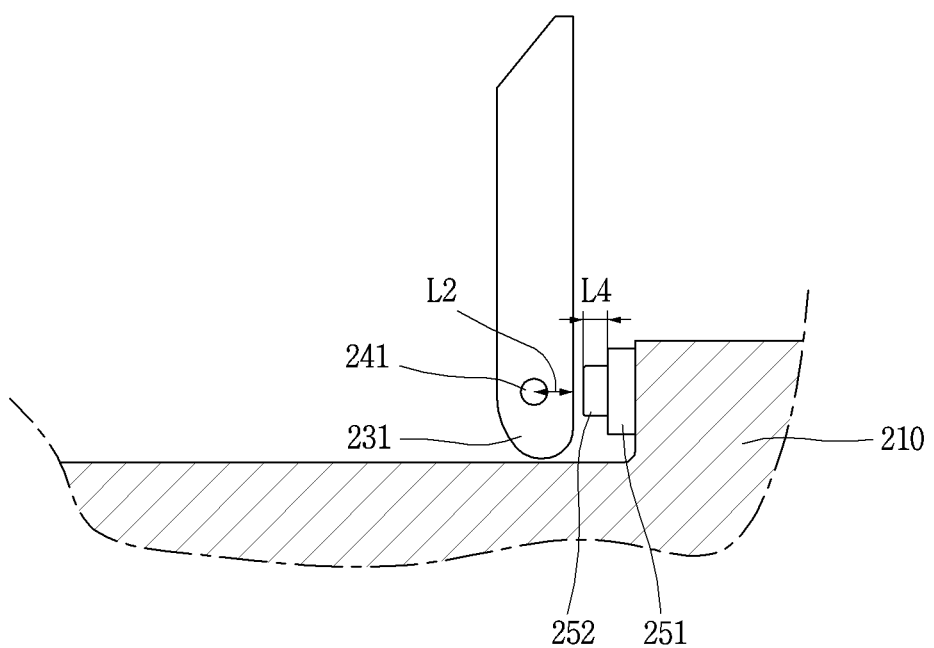

FIG. 3A is an enlarged sectional diagram of the cover and its peripheral portions, taken along line A-A' of FIG. 2B, and FIG. 3B is an enlarged sectional diagram of the cover and its peripheral portions, taken along line A-A' of FIG. 2A.

Figure 4A:
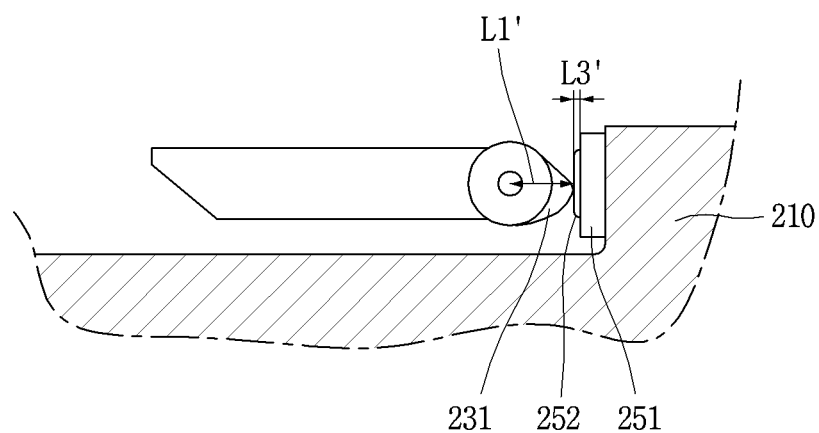
FIGS. 4A and 4B are conceptual diagrams showing layout relationships between the cover and the switch, corresponding to the closed state and the open state, respectively, according to another embodiment.
Figure 4B:
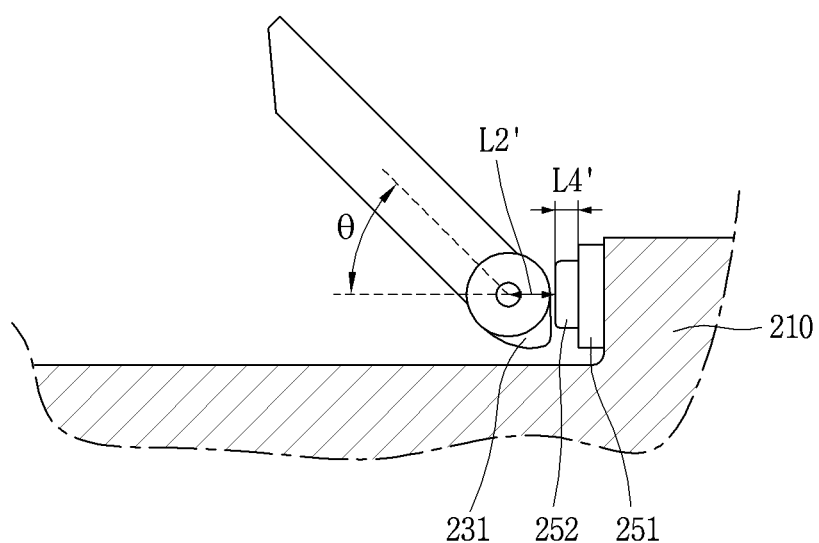

That is, FIGS. 3A and 3B are conceptual diagrams showing layout relationships between the cover 230 and the switch 250, corresponding to the closed state and the open state, respectively, according to one embodiment. In addition, FIGS. 4A and 4B are conceptual diagrams showing layout relationships between the cover 230 and the switch 250, corresponding to the closed state and the open state, respectively, according to another embodiment.

The keyboard 200 related to the present invention further includes the switch 250 for generating a signal corresponding to a control command related to the on and off operation of the keyboard body 210.

The switch 250 includes a casing 251 and a button portion 252 disposed on the casing 251. The casing 251 is disposed at a position fixed to the keyboard body 210 or the cover 230, and the button portion 252 is disposed to be pressed, protruding from the casing 251.

Referring to FIGS. 3A and 3B, the switch 250 may be disposed on the keyboard body 210 facing the one end 231 of the cover.

More specifically, the switch 250 may be disposed on the keyboard body 210 facing the one end 231 of the cover in the closed state. That is, the switch 250 may be disposed on the keyboard body 210 so that the thickness direction of the button portion 252 can cross the thickness direction of the keyboard body 210. Therefore, it can prevent the thickness of the keyboard body 210 from being increased due to the switch 250.

Referring to FIGS. 3A and 3B, the one end 231 of the cover is disposed to press the switch 250 in the closed state and not to press the switch 250 in the open state. In this case, the switch 250 can generate a signal corresponding to a control command of turning off the keyboard body 210, when pressed, and can generate a signal corresponding to a control command of turning on the keyboard body 210, when not pressed.

The cover 230 is configured such that the length from the hinge shaft 241 to the end point of the one end 231 of the cover 230 is greater than the length from the hinge shaft 241 to the side surface of the cover 230. Thus, when the cover 230 is closed, there is no gap between the cover 230 and the switch 250. On the contrary, when the cover 230 is opened, there is a gap between the cover 230 and the switch 250.

Specifically, a length from the hinge shaft 241 disposed on the one side of the cover 230 to the one end 231 of the cover is defined as a first length L1, and a length from the hinge shaft 241 to the side surface of the cover 230 is defined as a second length L2. Further, a thickness of the button portion 252 when the switch 250 is pressed is defined as a third length L3, and a thickness of the button portion 252 when the switch 250 is not pressed is defined as a fourth length L4.

In this embodiment, the cover 230 and the switch 250 are designed such that the sum of the first length L1 and the third length L3 is greater than the sum of the second length L2 and the fourth length L4.

In the above example, in the open state, the angle between the cover 230 and the one surface of the keyboard body 210 is approximately a right angle. Meanwhile, in the open state, the angle between the cover 230 and the one surface of the keyboard body 210 is determined by a preset angle. The preset angle may vary, so another embodiment related thereto will now be described.

Referring to FIGS. 4A and 4B, the preset angle may be theta ($\theta$), which is an acute angle. In this case, the one end 231 of the cover is disposed to press the button portion 252, when the angle between the cover 230 and the one surface of the keyboard body 210 is 0 or less than theta ($\theta$), and not to press the button portion 252, when the angle reaches theta ($\theta$).

In this case, a distance from the hinge shaft 241 to the point spaced apart by the angle ($\theta$) in the longitudinal direction of the cover 230 is defined as a second length L2'.

In this embodiment, the cover 230 and the switch 250 are designed such that the sum of the first length L1 and the third length L3 is greater than the sum of the second length L2' and the fourth length L4.

Figure 5A:
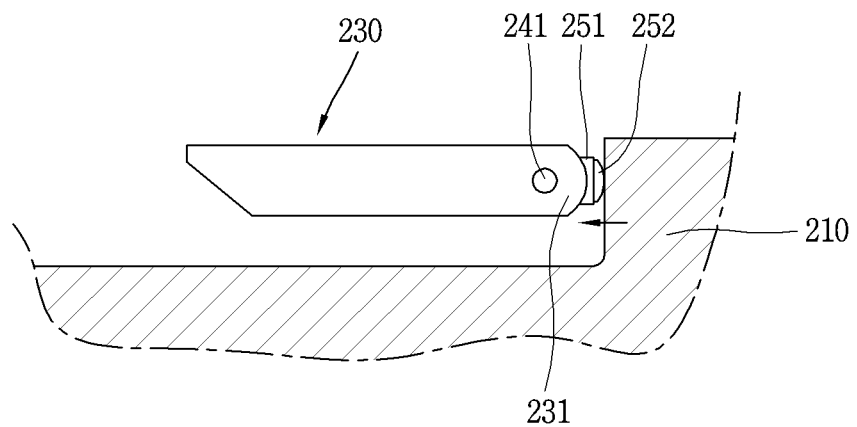
FIGS. 5A and 5B are conceptual diagrams showing layout relationships between the cover and the switch, corresponding to the closed state and the open state, respectively, according to a further embodiment.
Figure 5B:
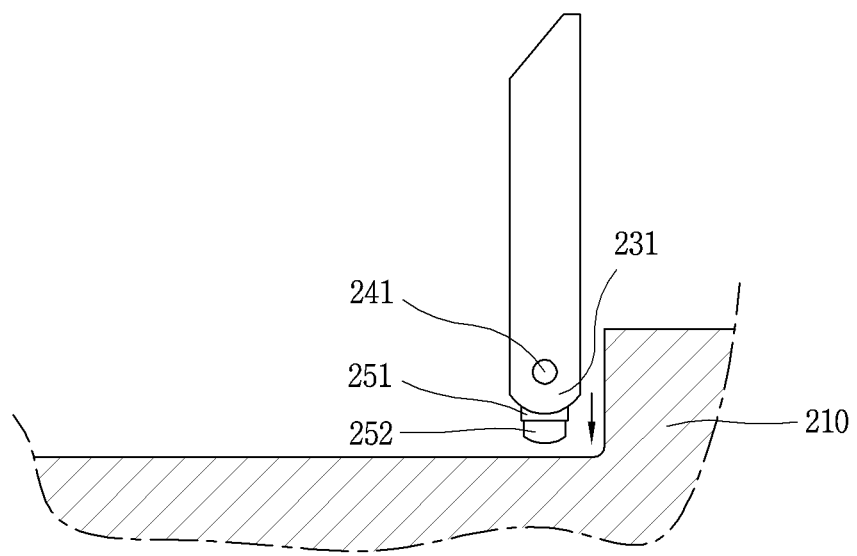

FIGS. 5A and 5B are conceptual diagrams showing layout relationships between the cover and the switch, corresponding to the closed state and the open state, respectively, according to a further embodiment.

In this embodiment, the switch 250 is disposed at the one end 231 of the cover. Specifically, the switch 250 is disposed on the cover so that the thickness direction of the button portion 252 can be consistent with the direction of the main surface of the cover. The button portion 252 may or may not be pressed by the keyboard body 210 depending on the opening and closing of the cover 230.

In the above example, the switch 250 generates a signal corresponding to a control command related to the on and off operation of the keyboard body 210. However, the switch 250 may generate a signal corresponding to a control command related to the wireless communication connection, which will be described below.

Although not shown, the keyboard 200 related to the present invention may further include a wireless communication unit 260. The wireless communication unit 260 wirelessly connects the keyboard 200 to the terminal body.

As described above, the one end 231 of the cover may be disposed to press the switch 250 in the closed state and not to press the switch 250 in the open state. In this embodiment, the switch 250 can generate a control command of turning on the communication connection, when pressed, and can generate a control command of turning off the communication connection, when not pressed.

Accordingly, the switch 250 can generate a signal corresponding to the control command related to the communication connection depending on the opening and closing of the cover 230.

Further, the switch 250 may simultaneously generate a control command of turning on and off the keyboard body 210 and a control command of turning on and off the communication connection between the keyboard body 210 and the terminal body.

Figure 6A:
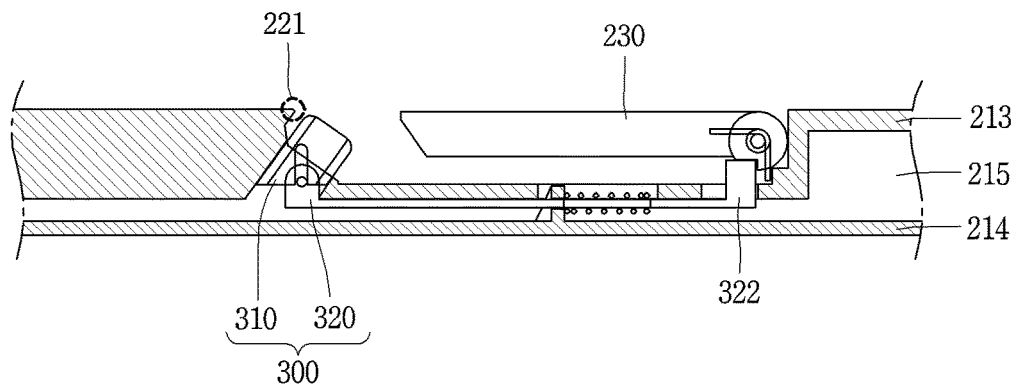
FIGS. 6A and 6B are conceptual diagrams showing an operation of a opening and closing module in a separated state and a mounted state, respectively.
Figure 6B:
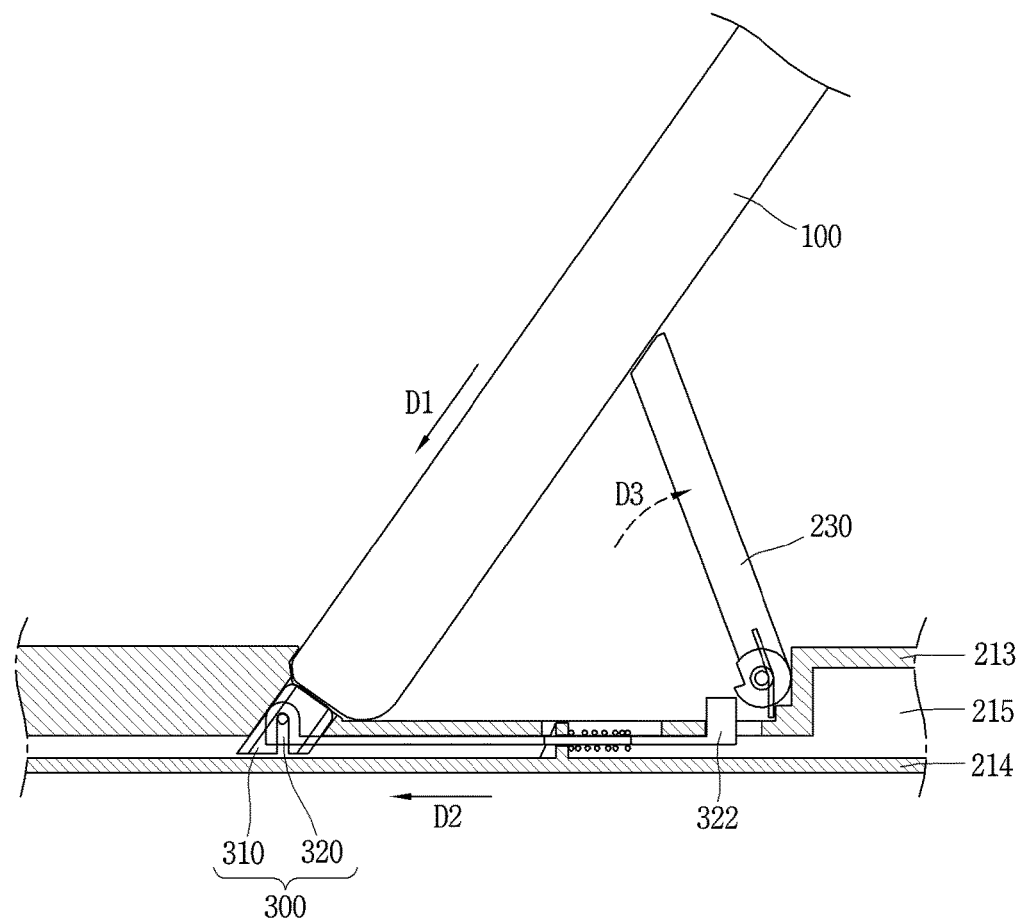
Figure 7A:
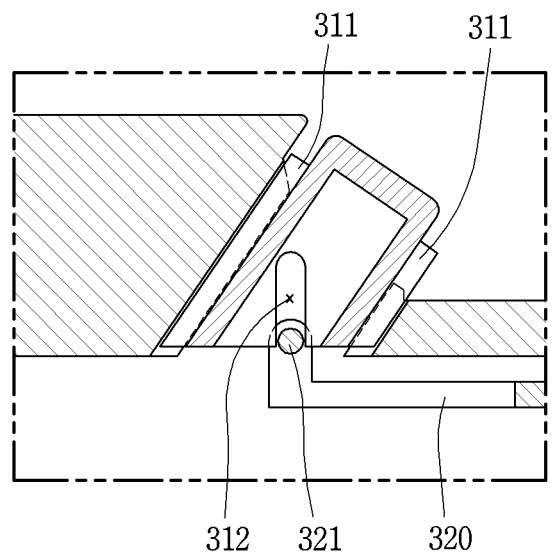
FIGS. 7A and 7B are conceptual diagrams showing an operation of a mounting portion and a driving portion in the separated state and the mounted state, respectively.
Figure 7B:
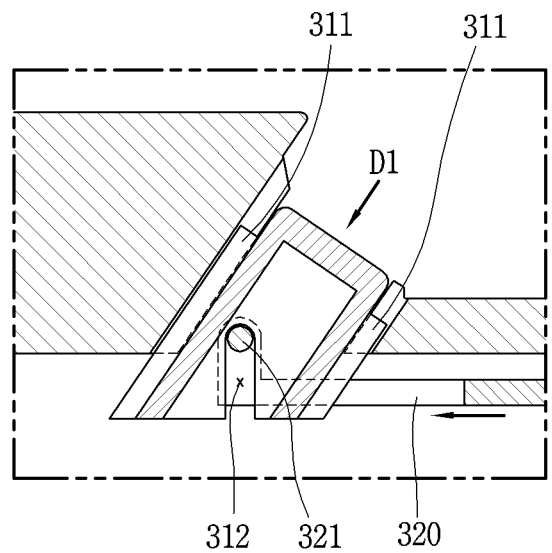

FIGS. 6A and 6B are conceptual diagrams showing the operation of the opening and closing module 300 in the separated state and the mounted state, respectively. In addition, FIGS. 7A and 7B are conceptual diagrams showing the operation of a mounting portion 310 and a driving portion 320 in the separated state and the mounted state, respectively.

Hereinafter, a state in which the terminal body is mounted on the mounting portion 310 may be referred to as a mounted state, and a state in which the terminal body is separated from the mounting portion 310 may be referred to as a separated state.

The opening and closing module 300 related to the present invention is disposed on the keyboard body 210 to open and close the cover 230 depending on the attachment and detachment of the terminal body.

Referring to the drawings, the opening and closing module 300 includes the mounting portion 310 directly contacting the terminal body and the driving portion 320 connected to the mounting portion 310.

The mounting portion 310 is disposed on one side of the receiving portion 220 and is movable along the mounting direction of the terminal body depending on the attachment and detachment of the terminal body.

Specifically, when the separated state is changed to the mounted state, the mounting portion 310 is moved by a preset distance in the mounting direction of the terminal body. Conversely, when the mounted state is changed to the separated state, the mounting portion 310 is moved by the preset distance in a direction opposite to the mounting direction of the terminal body.

Also, protrusions 311 are disposed on both sides of the mounting portion 310 and slots 212 are disposed in regions of the keyboard body 210 which are brought into contact with the both sides of the mounting portion 310. Therefore, the protrusions 311 are inserted into the slots 212 to be moved only within a preset space without being released to the outside.

Although not shown in the drawings, an elastic body (not shown) may be disposed between the mounting portion 310 and the keyboard body 210 touching the mounting portion 310. Accordingly, in the mounted state, the elastic body is compressively deformed between the mounting portion 310 and the keyboard body 210. When the terminal body is separated from the mounting portion 310, the mounting portion 310 is moved in a direction opposite to the mounting direction of the terminal body by force of the spring returning to its original shape.

On the other hand, the driving portion 320 is movably disposed on the keyboard body 210.

Referring to FIGS. 6A and 5B, the keyboard body 210 may include a top plate 213, a bottom plate 214, and a space 215 defined between the top plate 213 and the bottom plate 214. At least a part of the driving portion 320 is disposed to be movable in a direction parallel to the one surface of the keyboard body 210 on the space 215.

Further, the driving portion 320 is connected to the mounting portion 310 to be movable in cooperation with the movement of the mounting portion 310, which will be described below in more detail.

Referring to FIGS. 7A and 7B, a guide rail 312 is disposed on the mounting portion 310, and a guide protrusion 321 is disposed on the guide portion 320 to be movable on the guide rail 312.

Specifically, the guide rail 312 is formed to extend in a direction crossing the one surface of the keyboard body 210 from the rear side of the mounting portion 310 to the inside.

The guide protrusion 321 is disposed to penetrate the mounting portion 310 through the guide rail 312 on one side of the driving portion 320 disposed in the mounting portion 310.

Referring to FIGS. 7A and 7B, in the separated state, the guide protrusion 321 is positioned at the inlet side of the guide rail 312. When the separated state is changed to the mounted state, as the guide rail 312 is moved along the mounting direction of the terminal body, the guide protrusion 321 is moved in the guide rail 312 in a direction parallel to the one surface of the keyboard body 210. That is, in the mounted state, the guide protrusion 321 is positioned in the guide rail 312.

Thus, when the separated state is changed to the mounted state, the entire driving portion 320 is moved along a direction parallel to the one surface of the keyboard body 210 due to the aforementioned movement of the guide protrusion 321, which will be described below in more detail.

Figure 8A:
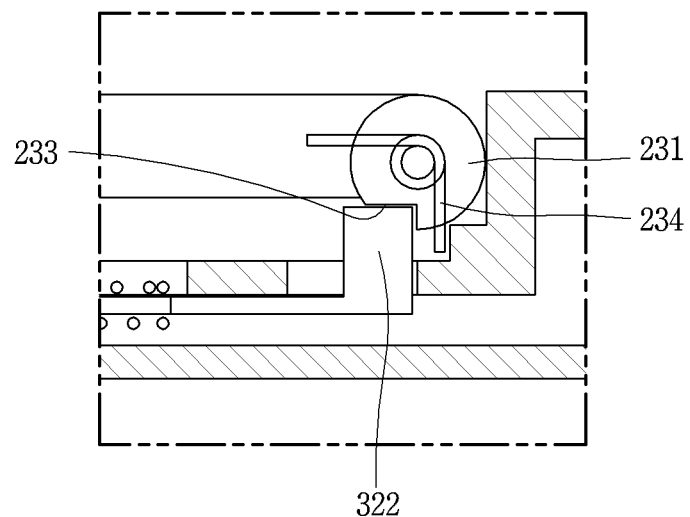
FIGS. 8A and 8B are conceptual diagrams showing engagement relationships between a stopper of the driving portion and a recess portion of a cover in the separated state and the mounted state.
Figure 8B:
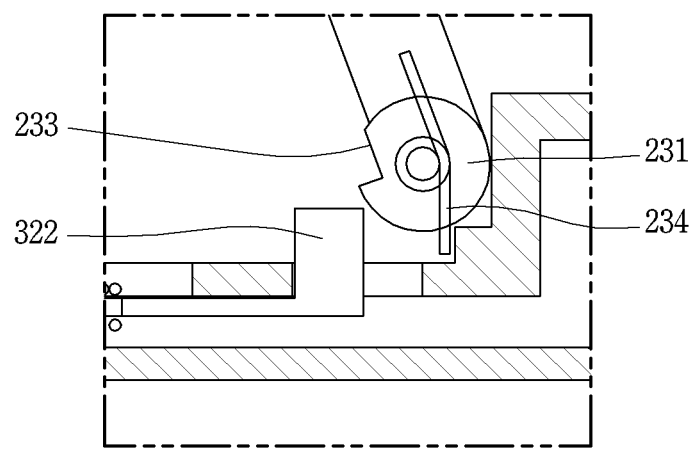

FIGS. 8A and 8B are conceptual diagrams showing engagement relationships between a stopper 322 of the driving portion 320 and a recess portion 233 of the cover 230 in the separated state and the mounted state.

In addition, a pressing unit 234 is disposed on one side of the cover 230. Specifically, one end of the pressing unit 234 is engaged with the cover 230, and at least a part of the other end of the pressing unit 234 is engaged with the keyboard body 210. The pressing unit 234 applies force to the cover 230 so that the cover 230 can be rotated to open.

Referring to FIGS. 8A and 8B, the stopper 322 for limiting rotation of the cover 230 is disposed on the other side of the driving portion 320, and the recess portion 233 is disposed at the one end 231 of the cover in order for the stopper 322 to be caught therein.

In the separated state, despite of the pressing unit 234, rotation of the cover 230 is limited because the stopper 322 is caught in the recess portion 233 of the cover 230. That is, the cover 230 is disposed substantially parallel to the one surface of the keyboard body 210.

On the contrary, in the mounted state, as the driving portion 320 is moved in a direction parallel to the one surface of the keyboard body 210, the stopper 322 is moved in a direction away from the recess portion 233. Accordingly, the stopper 322 and the recess portion 233 are released, and the cover 230 is rotated to open by the pressing unit 234.

On the other hand, although not shown, the switch 250 for generating a signal corresponding to a control command related to the on and off operation of the keyboard body 210 may be disposed on the keyboard body 210 facing the one end 231 of the cover, as described above.

In this case, due to the opening and closing module 300, the cover 230 is opened and closed depending on the mounting of the terminal body, and furthermore, presses the switch 250.

Meanwhile, when the mounted state is changed to the separated state, the driving portion 320 is moved along the one surface of the keyboard body 210 in a direction approaching the one end 231 of the cove, which will be described below in more detail.

Figure 9A:
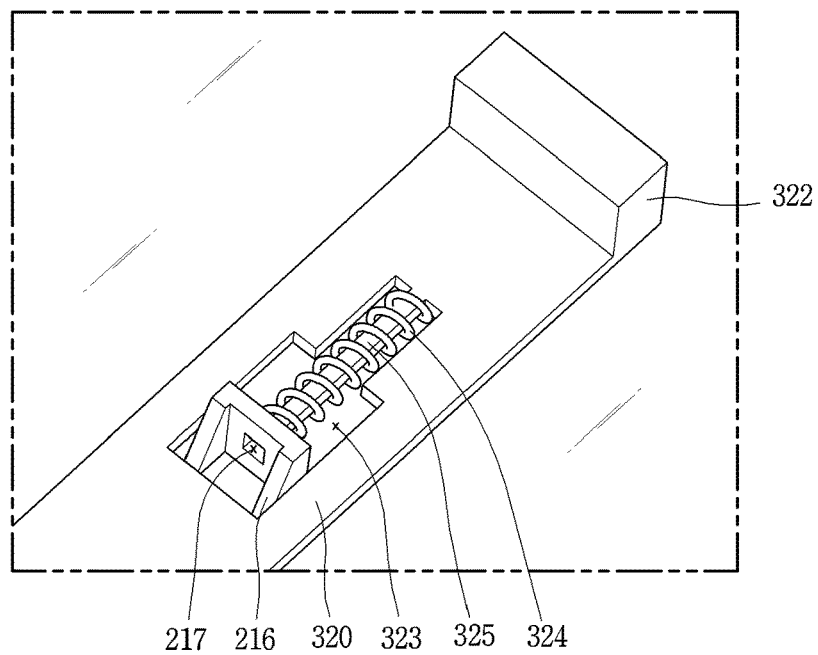
FIGS. 9A and 9B are conceptual diagrams showing an operation of an elastic portion of the opening and closing module in the separated state and the mounted state.
Figure 9B:
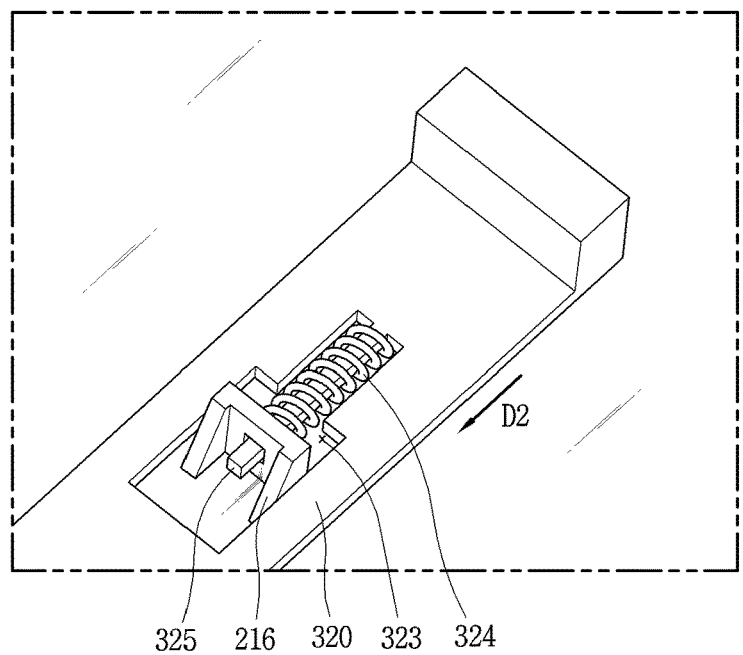

FIGS. 9A and 9B are conceptual diagrams showing the operation of the elastic portion 324 of the opening and closing module 300 in the separated state and the mounted state.

A groove 323 is defined between one side and the other side of the driving portion 320 along the longitudinal direction of the driving portion 320. The elastic portion 324, which is deformable along the moving direction of the driving portion 320, is disposed in the groove 323.

The elastic portion 324, which retains its original shape in the separated state, is compressively deformed when the separated state is changed to the mounted state. Therefore, when the terminal body is separated, the driving portion 320 returns to the original position due to force of returning to its original shape, which will be described below in more detail.

A compressing portion 216 for compressing the elastic portion 324 is disposed on the keyboard body 210. Specifically, the compressing portion 216 is disposed to penetrate the driving portion 320 through the groove 323 on the lower plate 214 of the keyboard body 210.

As the driving portion 320 is moved along the one surface of the keyboard body 210, the compressing portion 216 is relatively moved in the groove 323 of the driving portion 320.

Meanwhile, a penetrating portion 217 is disposed in the compressing portion 216, and a support portion 325 penetrating the penetrating portion 217 is disposed on the driving portion 320.

Specifically, the penetrating portion 217 is configured such that only the support portion 325 passes therethrough and the elastic portion 324 is caught therein. That is, the sectional size of the penetration portion 217 may be larger than that of the support portion 325 and smaller than that of the elastic portion 324.

The support portion 325 may be disposed in the elastic portion 324, generally in the form of a bar. Thus, it is possible to prevent the elastic portion 324 from being bent or released to the outside.

Also, one side of the support portion 325 is connected to one side of the groove 323 formed in the driving portion 320, while the other side of the support portion 325 is formed as a free end to penetrate the penetrating portion 217.

That is, when the separated state is changed to the mounted state, the driving portion 320 is moved along a direction D2. Accordingly, the support portion 325 passes through the penetrating portion 217, and the elastic portion 324 is compressively deformed by being caught in the penetrating portion 217.

When the mounted state is changed to the separated state, the driving portion 320 is moved along a direction opposite to the direction D2. Therefore, the support portion 325 comes out of the penetrating portion 217, and the elastic portion 324 returns to its original shape.

The operation of the opening and closing module 300 has been described above. Hereinafter, an attachable and detachable unit 270 applicable to the terminal body and the keyboard body 210 will be described below.

Figure 10:
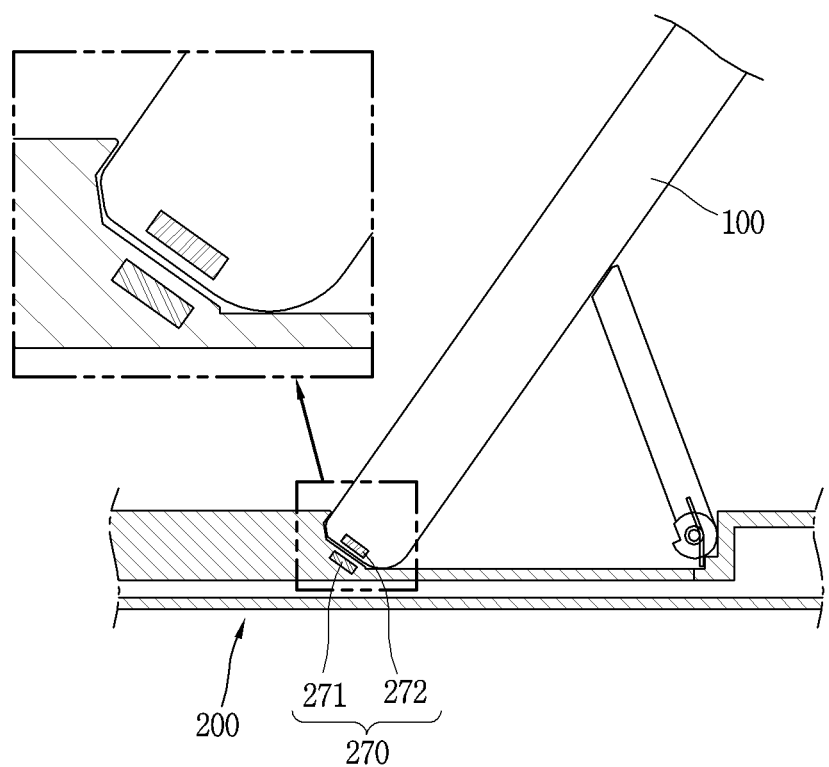
FIG. 10 is a sectional diagram showing a configuration of an attachable and detachable unit applied to the keyboard of the present invention.

FIG. 10 is a sectional diagram showing the configuration of the attachable and detachable unit 270 applied to the keyboard 200 of the present invention.

As shown, the terminal body and the keyboard body 210 may be provided with the attachable and detachable unit 270.

According to this embodiment, the attachable and detachable unit 270 may be implemented with a plurality of magnets that generate attractive force by magnetic force. These magnets may be disposed in the keyboard body 210 and the terminal body not to be exposed to the outside, which makes it possible to prevent deterioration of the appearance caused by the exposure of the attachable and detachable unit to the outside.

The attachable and detachable unit 270 may include a first magnet 271 disposed on a surface of the receiving portion 220 contacting the terminal body and a second magnet 272 disposed on the terminal body. In addition, the first magnet 271 and the second magnet 272 are provided in a pair at positions facing each other. Meanwhile, although not shown, the first magnet 271 may be disposed on the mounting portion 310.

The first magnet and the second magnet are configured to generate attractive force with each other. Thus, it is possible to more stably mount the terminal body on the keyboard body 210 using the attachable and detachable unit 270.

Hereinafter, connection terminals applicable to the keyboard body 210 and the terminal body will now be described.

Figure 11A:
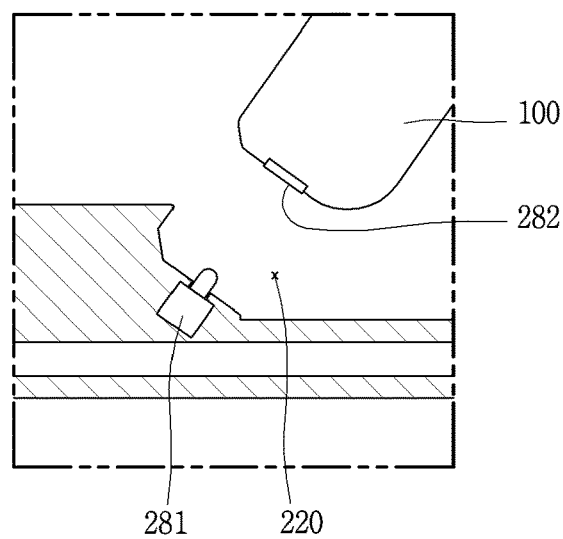
FIGS. 11A and 11B are conceptual diagrams showing position changes of connection terminals in the separated state and the mounted state.
Figure 11B:
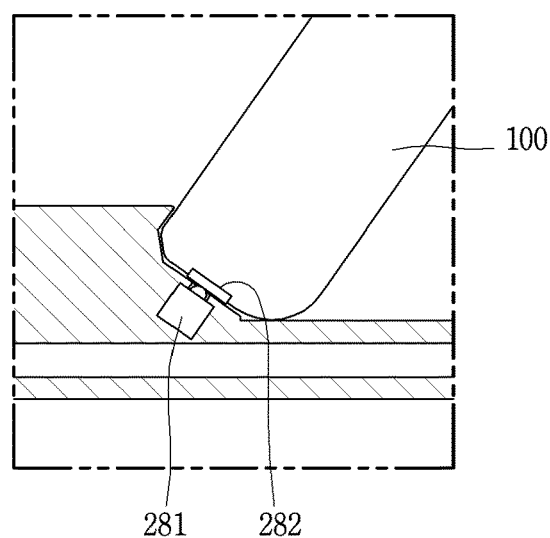

FIGS. 11A and 11B are conceptual diagrams showing position changes of the connection terminals in the separated state and the mounted state.

According to this embodiment, the first connection terminal 281 may be disposed on a surface of the receiving portion 220 contacting the terminal body. In addition, a second connection terminal 282 may be disposed in the terminal body at a position facing the first connection terminal 281. On the other hand, although not shown, the first connection terminal 281 may be disposed on the mounting portion 310.

The connection terminals 281 and 282 are made of a conductive material to electrically connect the keyboard body 210 to the terminal body. Specifically, the keyboard body 210 may supply power to the terminal body through the connection terminals.

Meanwhile, the first and second connection terminals 281 and 282 may be formed of a POGO pin and a POGO port, respectively. As shown in the figure, in the separated state, the POGO pin is disposed to protrude from the receiving portion 220. When the terminal body is received in the receiving portion 220, the POGO pin is depressed into the keyboard body 210, and the POGO port and the POGO pin are brought into contact with each other.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A keyboard detachably disposed on a terminal body, comprising:
    a keyboard body provided with key buttons on one surface;
    a receiving portion disposed on the one surface to receive at least a part of the terminal body; and
    a cover rotatably disposed on the one surface to cover at least a part of the receiving portion in a closed state and to expose the receiving portion in an open state,
    wherein the keyboard body is turned on and off depending on the opening and closing of the cover;
    a hinge module disposed at one end of the cover so that the cover can be rotated from the one surface of the keyboard body by a preset angle;
    a switch disposed on at least one of the one end of the cover and a part of the keyboard body facing the one end of the cover; and
    an opening and closing module disposed on the keyboard body to open and close the cover depending on an attachment and detachment of the terminal body,
    wherein the opening and closing module comprises:
    a mounting portion disposed on one side of the receiving portion to be movable along a mounting direction of the terminal body depending on the attachment and detachment of the terminal body; and
    a driving portion having one side connected to the mounting portion and being movable on the terminal body in cooperation with the movement of the mounting portion.

2. The keyboard of claim 1, wherein a signal corresponding to a control command related to the off operation of the keyboard body is generated when the switch is pressed in the closed state.

3. The keyboard of claim 1, wherein the switch is disposed on the keyboard body, and the one end of the cover presses the switch in one of the closed state and the open state and does not press the switch in the other of the closed state and the open state.

4. The keyboard of claim 1, wherein the switch is disposed on the one end of the cover, and the part of the keyboard body facing the one end of the cover presses the switch in one of the closed state and the open state and does not press the switch in the other of the closed state and the open state.

5. The keyboard of claim 3, wherein the switch is provided with a dome-shaped button portion, and
    wherein the switch is disposed on the keyboard body so that a thickness direction of the button portion can cross a thickness direction of the keyboard body.

6. The keyboard of claim 1, further comprising a hook portion disposed on a surface defining the one side of the receiving portion to prevent the terminal body from being rotated due to a touch pressure applied to the terminal body.

7. The keyboard of claim 1, wherein a guide rail extending in a direction crossing the one surface is disposed on the mounting portion, and a guide protrusion movable on the guide rail is disposed on one side of the driving portion.

8. The keyboard of claim 1, wherein a stopper for limiting rotation of the cover by being caught in a recess portion disposed at the one end of the cover is disposed on an other side of the driving portion.

9. The keyboard of claim 1, wherein a pressing unit for applying force to the cover for opening the cover is disposed at the one end of the cover.

10. The keyboard of claim 1, wherein the driving portion comprises an elastic portion deformable along a moving direction of the driving portion.

11. The keyboard of claim 10, wherein a groove is formed in the driving portion along a longitudinal direction of the driving portion so that the elastic portion can be disposed therein, and a compressing portion for penetrating the driving portion through the groove and compressing the elastic portion is disposed on the keyboard body.

12. The keyboard of claim 11, wherein a support portion for supporting the elastic portion is provided in the elastic portion and is disposed on the driving portion, and a penetrating portion is disposed in the compressing portion so that the support portion can penetrate therethrough.

13. The keyboard of claim 1, wherein a first magnet is disposed on a surface of the receiving portion contacting the terminal body, and a second magnet is disposed on the terminal body to generate attractive force with the first magnet.

14. The keyboard of claim 1, wherein a connection terminal for electrical connection between the keyboard body and the terminal body is disposed on a surface of the receiving portion contacting the terminal body.

15. A terminal system, comprising a terminal body and a keyboard detachably disposed on the terminal body,
wherein the keyboard comprises:
a keyboard body provided with key buttons on one surface;
a receiving portion disposed on the one surface to receive at least a part of the terminal body;
a cover rotatably disposed on the one surface to cover at least a part of the receiving portion in a closed state and to expose the receiving portion in an open state;
a wireless communication unit for connecting communication between the keyboard and the terminal body;
a switch disposed on at least one of the one end of the cover and the part of the keyboard body facing the one end of the cover; and
an opening and closing module disposed on the keyboard body to open and close the cover depending on an attachment and detachment of the terminal body,
wherein the opening and closing module comprises:
a mounting portion disposed on one side of the receiving portion to be movable along a mounting direction of the terminal body depending on the attachment and detachment of the terminal body; and
a driving portion having one side connected to the mounting portion and being movable on the terminal body in cooperation with the movement of the mounting portion.

16. The terminal system of claim 15, wherein a signal corresponding to a control command related to an off operation of the keyboard body is generated when the switch is pressed in the closed state.

17. The terminal system of claim 15, wherein the switch is disposed on the keyboard body, and the one end of the cover presses the switch in one of the closed state and the open state and does not press the switch in the other of the closed state and the open state.

18. The terminal system of claim 15, wherein the switch is disposed on the one end of the cover, and the part of the keyboard body facing the one end of the cover presses the switch in one of the closed state and the open state and does not press the switch in the other of the closed state and the open state.

* * * * *